(12) United States Patent
Dagner et al.

(10) Patent No.: US 12,296,667 B2
(45) Date of Patent: May 13, 2025

(54) SOIL PROCESSING MACHINE

(71) Applicant: Hamm AG, Tirschenreuth (DE)

(72) Inventors: Josef Dagner, Altenstadt (DE);
Thomas Klein, Mitterteich (DE);
Stefan Braunschläger, Bärnau (DE);
Ronny Pieske, Zwönitz (DE); Markus Golbs, Adorf (DE)

(73) Assignee: Hamm AG, Tirschenreuth (DE)

( * ) Notice: Subject to any disclaimer, the term of this patent is extended or adjusted under 35 U.S.C. 154(b) by 291 days.

(21) Appl. No.: 17/962,650

(22) Filed: Oct. 10, 2022

(65) Prior Publication Data
US 2023/0111171 A1   Apr. 13, 2023

(30) Foreign Application Priority Data
Oct. 12, 2021   (DE) .................... 10 2021 126 363.8

(51) Int. Cl.
*B60K 11/06* (2006.01)
*B60L 50/60* (2019.01)
(Continued)

(52) U.S. Cl.
CPC .............. *B60K 11/06* (2013.01); *B60L 50/60* (2019.02); *B60L 50/70* (2019.02); *B60L 50/75* (2019.02);
(Continued)

(58) Field of Classification Search
CPC .......... B60K 11/06; B60L 50/60; B60L 50/70; B60L 50/75; B60L 2200/40; B60L 2270/00; E01C 19/26; E01C 21/00; E02D 3/026
See application file for complete search history.

(56) References Cited

U.S. PATENT DOCUMENTS

| 9,365,401 B2 * | 6/2016 | Nakazawa ............... B60K 1/00 |
| 9,636,998 B1 * | 5/2017 | LeDoux ............... B60K 15/063 |

(Continued)

FOREIGN PATENT DOCUMENTS

| JP | 2004168149 |   | 6/2004 |   |
| JP | 2004168149 A | * | 6/2004 | ............ E02F 9/0858 |
| JP | 5572764 |   | 8/2014 |   |

OTHER PUBLICATIONS

Mechanical translation of JP-2004168149-A. (Year: 2004).*
German Search Report for German application No. DE 10 2021 126 363.8 dated Sep. 30, 2022, 12 pages (German).

*Primary Examiner* — John D Walters
(74) *Attorney, Agent, or Firm* — Rankin, Hill & Clark LLP

(57) ABSTRACT

A soil processing machine, in particular a soil compactor, comprises a machine frame and a casing (26, 28) carried on the machine frame and/or at least partially providing it and bounding a unit receptacle space (24), wherein the casing (26, 28) has a cooling air inlet area (30) and a cooling air outlet area (32) for cooling air flowing through the unit receptacle space (24), wherein a plurality of units around which cooling air can flow through the unit receptacle space (24) from the cooling air inlet area (30) to the cooling air outlet area (32) are arranged in the unit receptacle space (24), wherein at least two of the units arranged in the unit receptacle space (24) have maximum permissible operating temperatures different from one another and at least one unit having higher maximum permissible operating temperature is arranged upstream in a cooling air flow direction from the cooling air inlet area (30) to the cooling air outlet area (32) with respect to at least one unit having lower maximum permissible operating temperature.

17 Claims, 4 Drawing Sheets

(51) Int. Cl.
    *B60L 50/70*          (2019.01)
    *B60L 50/75*          (2019.01)
    *E01C 19/26*          (2006.01)
    *E01C 21/00*          (2006.01)
    *E02D 3/026*         (2006.01)

(52) U.S. Cl.
    CPC ....... *B60L 2200/40* (2013.01); *B60L 2270/00* (2013.01); *E01C 19/26* (2013.01); *E01C 21/00* (2013.01); *E02D 3/026* (2013.01)

(56) References Cited

U.S. PATENT DOCUMENTS

| | | | |
|---|---|---|---|
| 10,214,876 B2 * | 2/2019 | Nakagawa | B60K 6/48 |
| 2010/0068983 A1 | 3/2010 | Williams | |
| 2015/0298950 A1 | 10/2015 | Nakazawa et al. | |
| 2017/0120747 A1 | 5/2017 | LeDoux et al. | |
| 2017/0362797 A1 | 12/2017 | Nakagawa et al. | |

\* cited by examiner

SOIL PROCESSING MACHINE

The present invention relates to a soil processing machine, which can be designed as a soil compactor, for example, in order to compact an underlying surface, for example, asphalt material, gravel, or soil. Such soil processing machines can also be designed, for example, as wheel loaders, excavators, milling machines or agricultural machines.

With the transition to electric motor-driven soil processing machines, there is an increasing need to integrate units, in particular electrical or electronic units, into such soil processing machines, which have a comparatively high temperature sensitivity compared to mechanically working or operated units conventionally arranged in such soil processing machines.

It is the object of the present invention to provide a soil processing machine, for example a soil compactor, in which sufficient heat dissipation is also ensured for temperature-sensitive units in operation.

According to the invention, this object is achieved by a soil processing machine, in particular a soil compactor, comprising a machine frame and a casing carried on the machine frame and/or at least partially providing it and bounding a unit receptacle space, wherein the casing has a cooling air inlet area and a cooling air outlet area for cooling air flowing through the unit receptacle space, wherein a plurality of units around which cooling air can flow through the unit receptacle space from the cooling air inlet area to the cooling air outlet area are arranged in the unit receptacle space, wherein at least two of the units arranged in the unit receptacle space have maximum permissible operating temperatures different from one another and at least one unit having higher maximum permissible operating temperature is arranged upstream in a cooling air flow direction from the cooling air inlet area to the cooling air outlet area upstream with respect to at least one unit having lower maximum permissible operating temperature.

Due to the systematic arrangement of units to be cooled in the unit receptacle space in such a way that flow first occurs around one or more units having higher temperature sensitivity, i.e., lower maximum permissible operating temperature, and they are thus cooled before one or more units with lower temperature sensitivity and thus higher maximum permissible operating temperature are or will have the cooling air flow around them, it is ensured that the cooling air first cools temperature-sensitive units where it has the lowest temperature when flowing through the unit receptacle space, before it also flows around less temperature-sensitive units and thus absorbs heat from them. Although the cooling air is heated when it flows around more temperature-sensitive units, thus units having lower maximum permissible operating temperature, the air flowing around the units that are then less temperature-sensitive, thus units having higher maximum permissible operating temperature, is still at a sufficiently low temperature to keep these less temperature-sensitive units at a temperature below their maximum permissible operating temperature.

For example, units arranged in the unit receptacle space having higher maximum permissible operating temperature can comprise:
at least one drive unit designed as an electric motor, and/or
at least one hydraulic fluid cooler, and/or
at least one hydraulic working unit, preferably a hydraulic pump and/or hydraulic valve and/or hydraulic motor, and/or
at least one cooling air fan.

Units arranged in the unit receptacle space having lower maximum permissible operating temperature can comprise:
at least one source of electrical energy, and/or
at least one power electronics system area.

It can be seen from the preceding list that the units having lower maximum permissible operating temperature are generally units that are required in order to be able to operate an electric drive unit of a soil processing machine. In general, these are electrical or electronic components which are provided or required in order to supply an electrical drive unit with an operating voltage in a suitable manner. In addition to one or more such electric drive units, the units having higher maximum permissible operating temperature are generally mechanically operating components which are provided, for example, to conduct the drive energy provided by an electric drive unit to the system areas to be operated.

The at least one source of electrical energy can comprise a battery and/or a fuel cell, for example.

The at least one power electronics system area can comprise at least one inverter and/or at least one DC/DC converter, for example.

In a soil processing machine constructed according to the invention, at least one traction electric motor can be provided as a drive unit for a traction hydraulic pump and at least one steering electric motor can be provided as a drive unit for a steering hydraulic pump, and at least one traction inverter for providing a traction operating voltage for the traction electric motor can be assigned to the traction electric motor, while at least one steering inverter for providing a steering operating voltage can be assigned to the steering electric motor. Since such a traction inverter or also a battery used to provide the electrical energy is or are generally more heavily loaded during operation of a soil processing machine than a steering inverter or a DC/DC converter and, for this reason, generate more heat to be dissipated, it is proposed that at least one, preferably each traction inverter and/or at least one, preferably each source of electrical energy is arranged upstream in the cooling air flow direction from the at least one, preferably each steering inverter and/or the at least one, preferably each DC/DC converter.

Units can be classified as units having higher maximum permissible operating temperature or units having lower maximum permissible operating temperature, for example, if a maximum permissible operating temperature of units having higher maximum permissible operating temperature is above a temperature threshold and a maximum permissible operating temperature of units having lower maximum permissible operating temperature is below the temperature threshold.

For example, the temperature threshold can be in the range from 80° C. to 100° C.

In order to be able to arrange the units having higher maximum permissible operating temperature or having lower maximum permissible operating temperature structurally separate from one another, a first partition wall can be provided which divides the unit receptacle space into a cold space area and a hot space area arranged downstream in the cooling air flow direction with respect to the cold space area. At least one unit having lower maximum permissible operating temperature can be arranged in the cold space area, and at least one unit having higher maximum permissible operating temperature can be arranged in the hot space area.

In order to be able to dissipate heat efficiently via the first partition wall, it is proposed that the first partition wall be constructed from aluminum or material containing aluminum. The particularly good thermal conductivity of aluminum can thus be used.

For efficient cooling of the units having lower maximum permissible operating temperature, a second partition wall dividing the cold space area into a main cooling air flow volume and a secondary cooling air flow volume can be provided in the cold space area. To establish a flow connection, at least one cooling air passage flow opening providing a cooling air flow connection between the main cooling air flow volume and the hot space area can be provided in the first partition wall. Alternatively or additionally, it can be provided that more than 50% of the cooling air flow from the main cooling air flow volume flows into the cold space area.

For good dissipation of heat from the area of the second partition wall and any heat-generating units or system areas provided thereon, it is advantageous if the second partition wall is constructed from aluminum or material containing aluminum.

With such an allocation of the cold space area, it is particularly advantageous if at least one, preferably each power electronics system area, thus, for example, at least one, preferably each inverter and/or at least one, preferably each DC/DC converter, is arranged on a side of the partition wall facing towards the secondary cooling air flow volume and/or at least one, preferably each source of electrical energy, thus, for example, at least one, preferably each fuel cell or battery, is arranged in the main cooling air flow volume. The second partition wall, which is advantageously constructed from metal material, for example aluminum material, provides a large surface around which cooling air can flow, via which heat transferred from units carried on the second partition wall can be efficiently dissipated.

To generate a flow of cooling air, at least one cooling air fan can be provided for conveying cooling air from the cooling air inlet area to the cooling air outlet area through the unit receptacle space.

For an efficient conveying operation, for example, at least one cooling air fan can be arranged on the first partition wall in the area of a cooling air passage flow opening.

The present invention is described in detail below with reference to the attached figures. In the figures.

Figure 1:
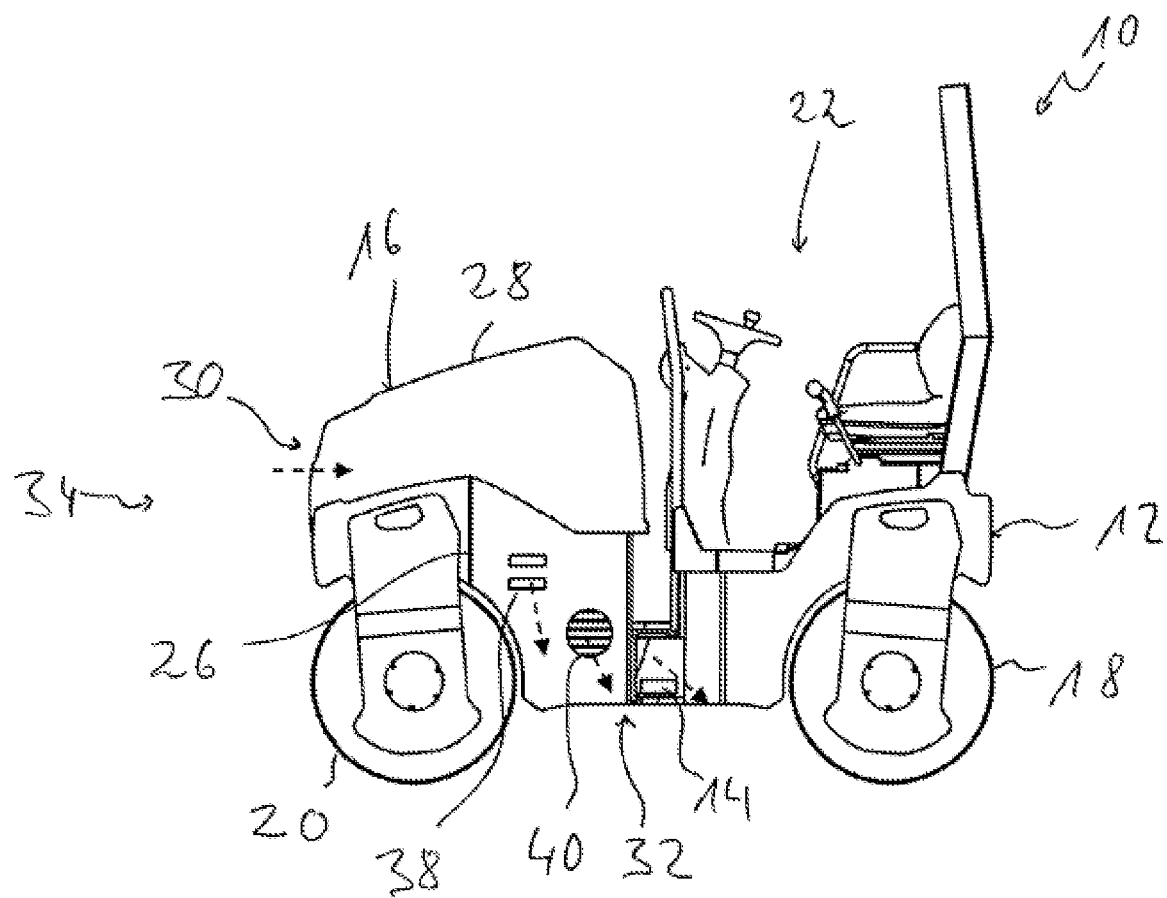
FIG. 1 shows a side view of a soil processing machine designed as a soil compactor.

The present invention is explained below by way of example on the basis of a soil processing machine designed as a soil compactor 10. The soil compactor 10 shown in a side view in FIGS. 1 and 2 comprises a rear carriage 12 and a front carriage 16, which is connected to the rear carriage 12 in the area of an articulated connection 14 so it is pivotable around a steering axis. A soil processing roller 18 or 20, respectively, is rotatably supported on the rear carriage 12 and on the front carriage 16 around a roller axis of rotation orthogonal to the plane of the drawing of FIGS. 1 and 2. In the exemplary embodiment shown, both soil processing rollers 18, 20 are driven to rotate in order to move the soil compactor 10 over the underlying surface to be compacted. Furthermore, a control stand 22 is arranged on the rear carriage 12, in which an operator can sit in order to actuate the actuating elements arranged there to operate the soil compactor 10.

Figure 2:
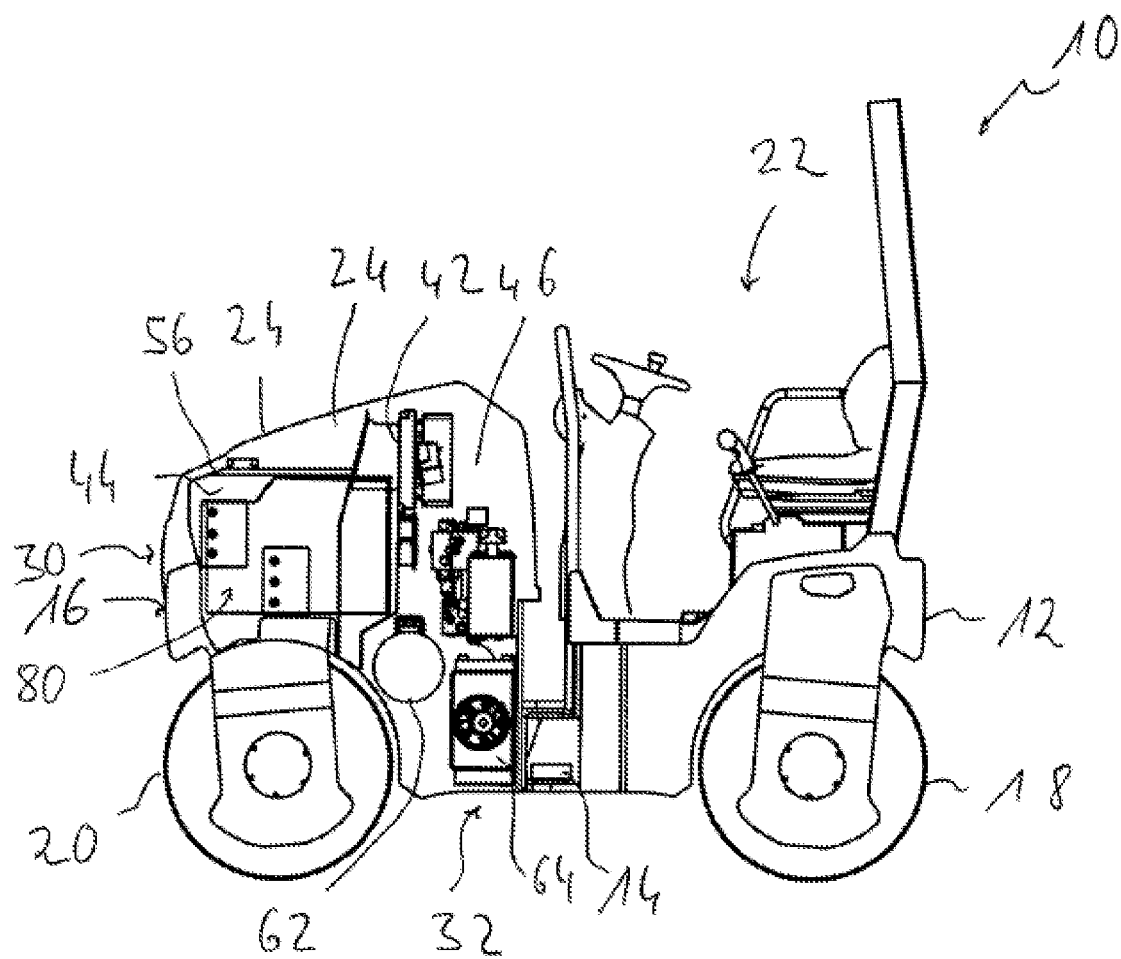
FIG. 2 shows a side view corresponding to FIG. 1 having a representation of units arranged in a unit receptacle space.
Figure 3:
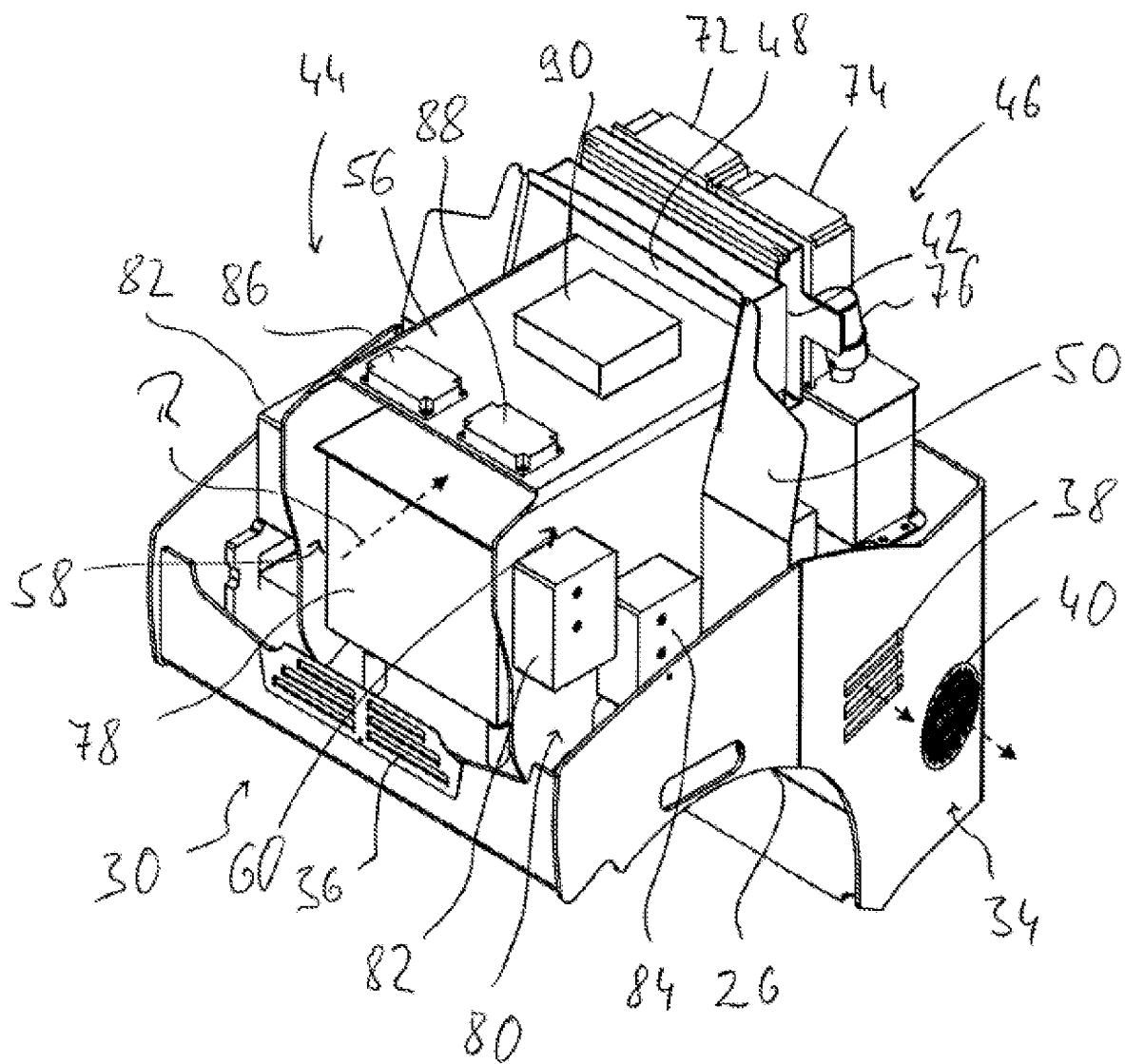
FIG. 3 shows a perspective view of a part of a front carriage of the soil processing machine of FIG. 1 with units arranged in the unit receptacle space.

In the case of the soil compactor 10 illustrated in FIGS. 1 and 2, a large part of the units provided for the operation thereof are arranged in a unit receptacle space 24 formed on the front carriage 16. The unit receptacle space 24 is bounded on the outside in some areas by a fixed casing 26 provided on a machine frame of the front carriage 16 and/or providing this frame at least in certain areas and a movable casing 28 attached to the fixed casing 26 or the front carriage 16, for example in a pivotable manner, in such a way that the unit receptacle space 24 is essentially only open in the area of a cooling air inlet area 30 for the entry of cooling air and is open in the area of a cooling air outlet area 32 for the exit of cooling air. The cooling air inlet area 30 can be oriented towards a front side 34 of the soil compactor 10 and can comprise a plurality of cooling air inlet openings 36, which can be seen for example in FIG. 3 on the fixed casing 26, and corresponding cooling air inlet openings on the movable casing 28. The cooling air outlet area 32 can include outlet openings 38 or also outlet openings 40 on surface areas of the stationary casing 26 oriented on both sides of the soil compactor 10. The fixed casing 26 can also be open in the area of the articulated connection 14 between the rear carriage 12 and the front carriage 14 in order, as indicated by a flow arrow, to be able to discharge cooling air from the unit receptacle space 24 in this area as well. In the other areas of the fixed casing 26 or the movable casing 28, the unit receptacle space 24 can be essentially sealed off to the outside, wherein it is to be noted that it is not absolutely necessary to provide a completely airtight seal here. It is important that the cooling air for providing a cooling air flow direction R, indicated by the flow arrows in FIGS. 1, 3, and 4, through the unit receptacle space 24, enters the unit receptacle space 24 for the most part in the area of the cooling air inlet area 30 and exits from the unit receptacle space 24 for the most part via the cooling air outlet area 32.

Figure 4:
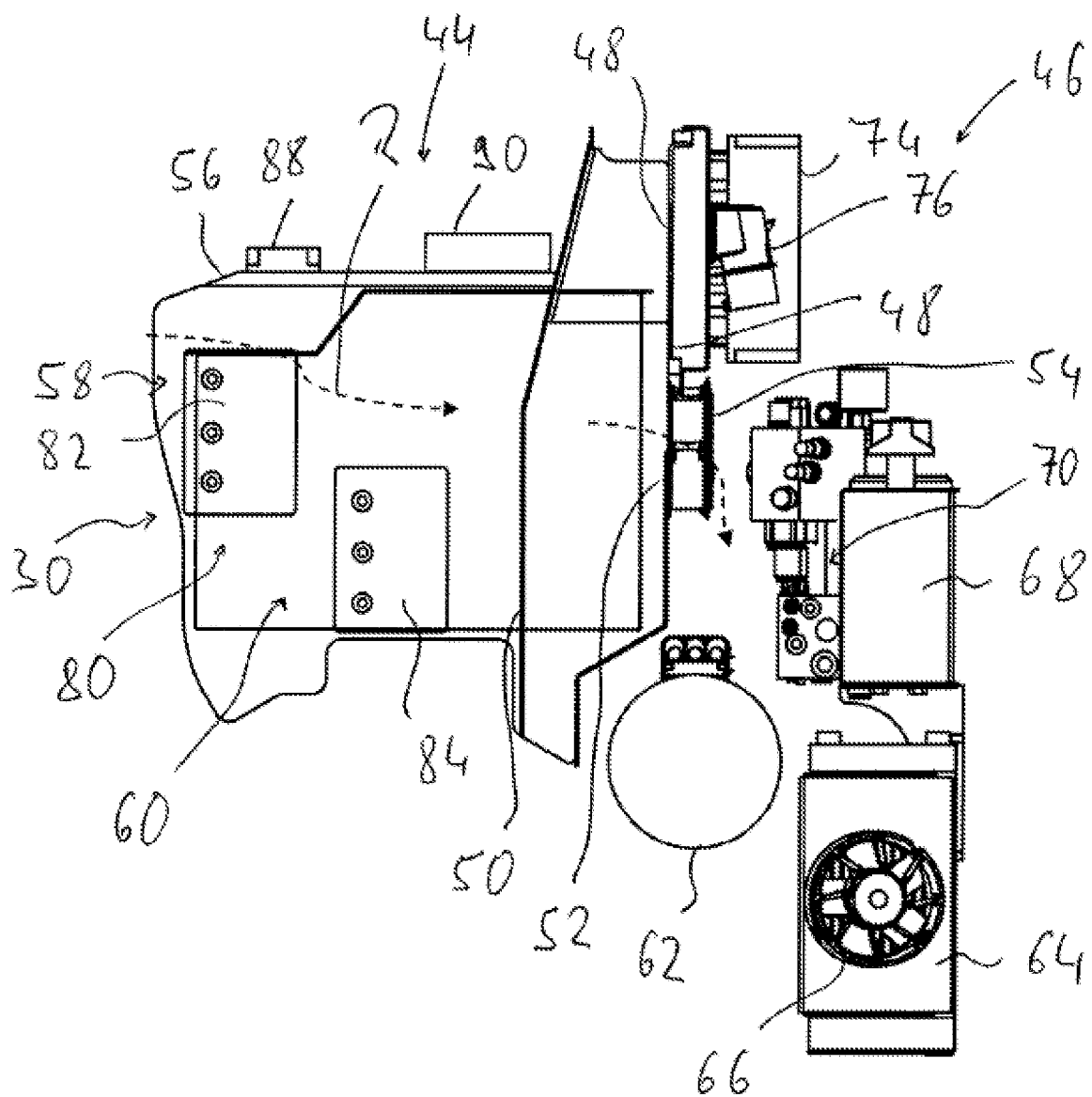
FIG. 4 shows a schematic side view of the units arranged in the unit receptacle space.

The unit receptacle space 24 is divided by a first partition wall 42 into a cold space area 44 that can be seen on the left in FIG. 4 and a hot space area 46 that can be seen on the right in FIG. 4. The partition wall 42 can be composed of multiple wall parts and, for example, can have wall regions 48 or 50 that are offset from one another in the cooling air flow direction R. In cooperation with the movable casing 28, it is ensured that cooling air entering the cold space area 44 via the cooling air inlet area 30 essentially only reaches the hot space area 46 from the cold space area 44 in the area of a cooling air passage flow opening 52 formed in the wall area 48 of the first partition wall 42. In order to generate this flow, a cooling air fan 54 can be provided, which is preferably positioned in the area of the cooling air flow opening 52 in the first partition wall 42 on the side facing towards the hot space area 46.

The cold space area 44 is divided by a substantially U-shaped second partition wall 56 into a main cooling air flow volume 58 bounded by the second partition wall 56 and on the lower side by the fixed casing 26 and a secondary cooling air flow volume 60 formed substantially on the outside of the second partition wall 56 and bounded on the outside by the fixed casing 26 and also by the movable casing 28. The secondary cooling air flow volume 60 is essentially sealed off toward the hot space area 46 by the frame-like wall area 50 of the first partition wall 42, so that the cooling air introduced into the cold space area 44 is conducted essentially completely through the main cooling air flow volume 58 and through the cooling air passage flow opening 52 in the wall area 48 of the first partition wall 42 into the hot space area 46.

The units arranged on the front carriage 16 of the soil compactor 10 have different maximum permissible operating temperatures from one another. Such maximum permissible operating temperatures can be defined or specified, for example, by the producer of such units or by the producer of the soil compactor 10, specifically as temperatures that ensure that a respective unit can still be operated at such a temperature without being damaged. Such a maximum permissible operating temperature can have, for example, a temperature interval from a temperature which is known to have the greatest probability of causing damage or failure of a respective unit.

The system described below in the arrangement of various units on the front carriage 16 is intended to have the cooling air first flow around units that are more sensitive to temperature and therefore have lower maximum permissible operating temperature, before the cooling air also flows around units having lower temperature sensitivity and thus higher maximum permissible operating temperature. In particular, it can be provided that a temperature threshold in the range from 80° C. to 100° C. draws a boundary between units having lower maximum permissible temperature sensitivity and units having higher maximum permissible operating temperature. The units which are to be regarded as units having lower maximum permissible operating temperature are arranged farther upstream, thus in particular in the cold space area 44, while units which are to be regarded as units having higher maximum permissible operating temperature are arranged farther downstream, in particular in the hot space area 46. As explained below, in the cold space area 44 and also in the hot space area 46, the units respectively arranged there can also be positioned relative to one another in such a way that in these different space areas as well, flow first occurs around those units which, for example, have the lower maximum permissible operating temperature of the units having lower maximum permissible operating temperature.

One or more electric motors 62 are arranged in the hot space area 46 in the electric motor-operated soil compactor 10. The electric motors 62 comprise a traction electric motor which, via a traction hydraulic pump in a traction hydraulic circuit, generates or conveys pressurized fluid, for example, hydraulic oil, to feed the two traction hydraulic motors assigned to the two soil processing rollers 18, 20. The electric motors 62 can furthermore comprise a steering electric motor, which feeds pressure fluid into a steering hydraulic circuit via a steering hydraulic pump in order to feed steering elements provided for steering the soil compactor 10, for example, piston/cylinder units, with pressure fluid. The pressure fluid flowing in the steering hydraulic circuit, thus, for example, hydraulic oil, can also be used to drive imbalance arrangements provided in the soil processing rollers 18, 20 in order to set the soil processing rollers 18, 20 into a vibration movement and/or an oscillation movement.

A further unit arranged in the hot space area 46 is a cooler 64 through which the fluid of the traction hydraulic circuit and/or the steering hydraulic circuit can flow in order to cool it. A cooler fan 66 can be assigned to the cooler 64, which emits cooling air from the hot space area 46 to the outside through the cooling air outlet openings 40 provided on one side of the fixed casing 26. Independently of the operation of the cooling air fan 54, the cooler fan 66 also generates a cooling air flow, which ensures that cooling air flows through the unit receptacle space 24 in the cooling air flow direction R.

Further units arranged in the hot space area 46 are a fluid tank 68 and hydraulic valves or hydraulic motors 70. Via these, fluid is conducted according to the required operation in the various hydraulic circuits in such a way that it reaches the system areas to be supplied with pressure fluid or flows back into the tank 68 or through the cooler 64.

As further units in the hot space area 46 in the example shown, chargers 72, 74 are arranged adjacent to one another and are carried on the first partition wall 42 and are permanently installed and therefore in principle are not detachable from the soil compactor. The chargers 72, 74 can be connected to an external power supply via a connector plug 76 in order to feed in the energy required to operate the electric motors 62 and to store it in a battery 78 positioned in the cold space area 44, in particular in the upstream end area of the main cooling air flow volume 58 Such a battery 78 forms a source of electrical energy which could be supplemented or replaced by a fuel cell, for example. If exclusively a fuel cell is used as the source of electrical energy, the chargers 72, 74 could be dispensed with The chargers 72, 74 carried on the first partition wall 42 on the side facing towards the hot space area 46 can be assigned independently operable fans to ensure that in charging operation, which occurs, for example, when the soil compactor 10 is deactivated, a cooling air flow flowing around the chargers 72, 74 is generated. In principle, however, the chargers 72 can also be used to charge the battery 78 when the soil compactor 10 is in operation, if the soil compactor 10 can also operate in a wired manner, for example via the connection plug 76. In this state, the various system areas to be operated electrically, in particular the electric motors 62, are simultaneously supplied with electrical energy via such a connecting cable and the connection plug 76 and the battery 78 is charged by means of the chargers 72, 74. In such a state, the cooling air flow can be generated by the cooling air fan 54 or also by the cooler fan 66. At the same time, the fans assigned to the chargers 72, 74 can also be operated in order to dissipate sufficient heat from them.

In the cold space area 44, in addition to the battery 78, which is arranged essentially in the main cooling air flow volume 58 enclosed by the second partition wall 56, on the side of the second partition wall 56 facing towards the secondary cooling air flow volume 60, for example on the two laterally oriented areas thereof providing power electronics system areas, inverters 80 are carried, which generate the three-phase voltage required for the operation of the electric motors 62 in particular from the DC voltage provided by the battery. The inverters 80 include traction inverters 82, which generate the voltage required for the traction electric motor, and steering inverters 84, which generate the voltage required for the steering electric motor. It can be seen in FIG. 4 that the cooling air introduced via the cooling inlet area 30 flows first around the traction inverters 82, which are more heavily loaded during operation than the steering inverters 84, and is therefore even colder, before this air also flows around the steering inverters 84. The cooling interaction between the cooling air and the various inverters 80 takes place primarily in that the inverters 80 are arranged in the secondary cooling air flow volume 60, in which only a comparatively small part of the cooling air flowing through the unit receptacle space 24 flows or circulates, and thus heat is transferred to the second partition wall 56, which provides a comparatively large surface around which cooling air can flow. This wall is made of a material having good thermal conductivity, for example aluminum material, so that efficient removal of the heat generated in the area of the inverter 80 is ensured.

On the side of the second partition wall 56 facing towards the cooling air secondary flow volume 60, for example in an upper area thereof, multiple DC/DC converters (direct current/direct current converters) 86, 88, which also provide power electronics system areas, are provided in order in the vehicle electrical system to provide the voltage level required for the operation of various electrical system areas to be operated, for example, the lights, various control units, or the like. Since the DC/DC converters are also less heavily loaded during operation or are less thermally sensitive than, for example, the comparatively strongly loaded traction inverters 82, these, like the steering inverters 84, can also be arranged downstream in the cooling air flow direction R with respect to the traction inverter 82 or also downstream with respect to the thermally sensitive battery 78 or the upstream end area thereof.

Further electrical components, for example, fuses, can be provided at the upper side of the second partition wall 56, for example, housed in a housing 90. Although these components are in principle less sensitive to temperature, in the example shown they are positioned there due to the fact that there is space in this area of the second partition wall to accommodate these components. In principle, it could also be provided, for example, that one or both chargers 72, 74 is or are positioned in this area. In particular when the soil compactor 10 is not to be operated in a wired manner and the chargers 72, 74 are therefore generally in operation when the remaining system areas of the soil compactor 10 are not activated, there is no interaction between the thermal load of the chargers 72, 74, on the one hand, and the thermal load of the other units arranged in the unit receptacle space 24, on the other hand, so that the chargers 72, 74 can be arranged in the hot space area 46 or in the cold space area 44, depending on where sufficient space is available.

The previously explained allocation of various units on the soil compactor 10 in the unit receptacle space 24 ensures that those units which have higher temperature sensitivity and are therefore to be operated at a lower maximum permissible operating temperature are arranged in the cold space 44 and the cooling air which is still cooler therefore flows around them first. Those units which are less temperature-sensitive and can therefore be operated at a higher maximum permissible operating temperature are positioned in the hot space area 46 and the cooling air flows around them after it has absorbed heat in the cold space area 44 and therefore already has a raised temperature. However, the cooling air is still sufficiently cold when flowing through the hot space area 46 to be able to dissipate heat from the units arranged there having higher maximum permissible operating temperature and to keep them at a temperature level suitable for their operation.

For efficient heat dissipation, it is also advantageous if the first partition wall 42 and/or the second partition wall 56 is made of aluminum or material containing aluminum, for example is bent from sheet aluminum. Compared to steel, aluminum has a significantly higher thermal conductivity, so that in particular from areas into which heat is introduced into these walls by heat-generating units carried on them, this heat can be quickly conducted into other areas of this walls exposed to the cooling air or ambient air to dissipate heat. In order to ensure good heat transfer contact, particularly also in the area adjacent to different units on these walls, it is advantageous if cooling elements or heat transfer elements made of aluminum or material containing aluminum are provided on these units for contact on the first partition wall 42 or the second partition wall 56.

As already explained, the assignment to the cold space area 44, on the one hand, and to the hot space area 46, on the other hand, can be achieved by the maximum permissible operating temperature of the units to be arranged in the cold space area 44 being below a temperature threshold provided for this purpose, for example in the range from 80° C. to 100° C., while the maximum permissible operating temperature of the units to be accommodated in the hot space area 46 can be above this temperature threshold. If the unit receptacle space is not divided into flow areas separated from one another by a partition wall, for example, it can be provided that units having lower maximum permissible operating temperature are arranged in succession in the cooling air flow direction upstream from units having higher maximum permissible operating temperature, for example in such a way that the maximum permissible operating temperature of units in succession increases in the cooling air flow direction. In principle, depending on the structural conditions, the system can be disrupted locally, so that, for example, although this is not necessary for thermal reasons, a unit with a higher maximum permissible operating temperature is positioned further upstream, for example, in the cold space area, or, for example, between two units having maximum permissible operating temperature which is lower but increasing in relation to one another.

The invention claimed is:

1. A soil processing machine, comprising a machine frame and a casing carried on the machine frame and/or at least partially providing it and bounding a unit receptacle space, wherein the casing has a cooling air inlet area and a cooling air outlet area for cooling air flowing through the unit receptacle space, wherein a plurality of units around which cooling air is flowable through the unit receptacle space from the cooling air inlet area to the cooling air outlet area is arranged in the unit receptacle space, wherein at least two of the units arranged in the unit receptacle space have maximum permissible operating temperatures different from one another and at least one unit having a lower maximum permissible operating temperature is arranged upstream in a cooling air flow direction from the cooling air inlet area to the cooling air outlet area with respect to at least one unit having a higher maximum permissible operating temperature,
   wherein a first partition wall is provided that divides the unit receptacle space into a cold space area and a hot space area arranged downstream in the cooling air flow direction with respect to the cold space area, and wherein at least one unit having a lower maximum permissible operating temperature is arranged in the cold space area and at least one unit having a higher maximum permissible operating temperature is arranged in the hot space area.

2. The soil processing machine according to claim 1, wherein units arranged in the unit receptacle space having the higher maximum permissible operating temperature comprise:
   at least one drive unit designed as an electric motor, and/or
   at least one hydraulic fluid cooler, and/or
   at least one hydraulic working unit, and/or
   at least one cooling air fan, wherein units arranged in the unit receptacle space having the lower maximum permissible operating temperature comprise:
at least one source of electrical energy,
and/or
at least one power electronics system area.

3. The soil processing machine according to claim 2, wherein the at least one source of electrical energy comprises a battery and/or a fuel cell.

4. The soil processing machine according to claim 2, wherein the at least one power electronics system area comprises at least one inverter and/or at least one DC/DC converter.

5. The soil processing machine according to claim 4, wherein at least one traction electric motor is provided as a drive unit for a traction hydraulic pump and at least one steering electric motor is provided as a drive unit for a steering hydraulic pump, wherein at least one traction inverter for providing a traction operating voltage for the traction electric motor is assigned to the traction electric motor, wherein at least one steering inverter for providing a steering operating voltage is assigned to the steering electric motor, and wherein at least one traction inverter and/or at least one source of electrical energy is arranged upstream in the cooling air flow direction with respect to the at least one steering inverter and/or the at least one DC/DC converter.

6. The soil processing machine according to claim 1, wherein a maximum permissible operating temperature of units having the higher maximum permissible operating temperature is above a temperature threshold and a maximum permissible operating temperature of units having the lower maximum permissible operating temperature is below the temperature threshold.

7. The soil processing machine according to claim 6, wherein the temperature threshold is in the range from 80° C. to 100° C.

8. The soil processing machine according to claim 1, wherein the first partition wall is constructed from aluminum or material containing aluminum.

9. The soil processing machine according to claim 1, wherein a second partition wall is provided in the cold space area, which divides the cold space area into a main cooling air flow volume and a secondary cooling air flow volume, wherein, in the first partition wall, at least one cooling air passage flow opening providing a cooling air flow connection between the main cooling air flow volume and the hot space area is provided and/or more than 50% of the cooling air flow flows from the main cooling air flow volume into the hot space area.

10. The soil processing machine according to claim 9, wherein the second partition wall is constructed from aluminum or material containing aluminum.

11. The soil processing machine according to claim 9, wherein units arranged in the unit receptacle space having the higher maximum permissible operating temperature comprise:
at least one drive unit designed as an electric motor,
and/or
at least one hydraulic fluid cooler,
and/or
at least one hydraulic working unit,
and/or
at least one cooling air fan,
and in that units arranged in the unit receptacle space having the lower maximum permissible operating temperature comprise:
at least one source of electrical energy,
and/or
at least one power electronics system area,
wherein at least one power electronics system area is arranged on a side of the second partition wall facing towards the secondary cooling air flow volume and/or at least one source of electrical energy is arranged in the main cooling air flow volume.

12. The soil processing machine according to claim 1 wherein at least one cooling air fan for conveying cooling air from the cooling air inlet area to the cooling air outlet area through the unit receptacle space is provided.

13. The soil processing machine according to claim 12, wherein a first partition wall is provided that divides the unit receptacle space into a cold space area and a hot space area arranged downstream in the cooling air flow direction with respect to the cold space area, and wherein at least one unit having the maximum permissible operating temperature is arranged in the cold space area and at least one unit having the higher maximum permissible operating temperature is arranged in the hot space area,
wherein at least one cooling air fan is arranged on the first partition wall in the area of a cooling air passage flow opening.

14. The soil processing machine according to claim 13, wherein the first partition wall is constructed from aluminum or material containing aluminum.

15. The soil processing machine according to claim 13, wherein a second partition wall is provided in the cold space area, which divides the cold space area into a main cooling air flow volume and a secondary cooling air flow volume, wherein, in the first partition wall, at least one cooling air passage flow opening providing a cooling air flow connection between the main cooling air flow volume and the hot space area is provided and/or more than 50% of the cooling air flow flows from the main cooling air flow volume into the hot space area.

16. A soil processing machine, comprising a machine frame and a casing carried on the machine frame and/or at least partially providing it and bounding a unit receptacle space, wherein the casing has a cooling air inlet area and a cooling air outlet area for cooling air flowing through the unit receptacle space, wherein a plurality of units around which cooling air is flowable through the unit receptacle space from the cooling air inlet area to the cooling air outlet area is arranged in the unit receptacle space, wherein at least two of the units arranged in the unit receptacle space have maximum permissible operating temperatures different from one another and at least one unit having a lower maximum permissible operating temperature is arranged upstream in a cooling air flow direction from the cooling air inlet area to the cooling air outlet area with respect to at least one unit having a higher maximum permissible operating temperature,
wherein units arranged in the unit receptacle space having the higher maximum permissible operating temperature comprise:
at least one drive unit designed as an electric motor,
and/or
at least one hydraulic fluid cooler,
and/or
at least one hydraulic working unit,
and/or
at least one cooling air fan,
wherein units arranged in the unit receptacle space having the lower maximum permissible operating temperature comprise:

at least one source of electrical energy,
and/or
at least one power electronics system area,
wherein the at least one power electronics system area comprises at least one inverter and/or at least one DC/DC converter,
wherein at least one traction electric motor is provided as a drive unit for a traction hydraulic pump and at least one steering electric motor is provided as a drive unit for a steering hydraulic pump, wherein at least one traction inverter for providing a traction operating voltage for the traction electric motor is assigned to the traction electric motor, wherein at least one steering inverter for providing a steering operating voltage is assigned to the steering electric motor, and wherein at least one traction inverter and/or at least one source of electrical energy is arranged upstream in the cooling air flow direction with respect to the at least one steering inverter and/or the at least one DC/DC converter.

17. A soil processing machine, comprising a machine frame and a casing carried on the machine frame and/or at least partially providing it and bounding a unit receptacle space, wherein the casing has a cooling air inlet area and a cooling air outlet area for cooling air flowing through the unit receptacle space, wherein a plurality of units around which cooling air is flowable through the unit receptacle space from the cooling air inlet area to the cooling air outlet area is arranged in the unit receptacle space, wherein at least two of the units arranged in the unit receptacle space have maximum permissible operating temperatures different from one another and at least one unit having a lower maximum permissible operating temperature is arranged upstream in a cooling air flow direction from the cooling air inlet area to the cooling air outlet area with respect to at least one unit having a higher maximum permissible operating temperature, wherein at least one cooling air fan for conveying cooling air from the cooling air inlet area to the cooling air outlet area through the unit receptacle space is provided;

wherein a first partition wall is provided that divides the unit receptacle space into a cold space area and a hot space area arranged downstream in the cooling air flow direction with respect to the cold space area, and wherein at least one unit having the maximum permissible operating temperature is arranged in the cold space area and at least one unit having the higher maximum permissible operating temperature is arranged in the hot space area, and wherein at least one cooling air fan is arranged on the first partition wall in the area of a cooling air passage flow opening.

* * * * *